United States Patent [19]

Pino

[11] Patent Number: 5,547,079
[45] Date of Patent: Aug. 20, 1996

[54] FISHING ROD AND ACCESSORIES CARRYING CASE

[76] Inventor: Victoria R. Pino, 540 La Vega Rd. SW., Albuquerque, N.M. 87105

[21] Appl. No.: 340,532

[22] Filed: Nov. 16, 1994

[51] Int. Cl.⁶ .................................................. B65D 85/00
[52] U.S. Cl. ..................... 206/315.11; 206/317; 206/523
[58] Field of Search ..................... 206/14, 314, 315.11, 206/317, 523, 570, 575

[56] References Cited

U.S. PATENT DOCUMENTS

| | | | |
|---|---|---|---|
| 1,674,352 | 6/1928 | Adams | 206/315.11 |
| 2,650,449 | 9/1953 | Suring | 206/315.11 |
| 2,706,036 | 4/1955 | Neal | 206/317 |
| 3,201,017 | 8/1965 | Morrissey | 206/315.11 |
| 3,641,697 | 2/1972 | Heidtman et al. | 206/315.11 |
| 3,811,562 | 5/1974 | Smith | 206/317 |
| 4,306,601 | 12/1981 | Wallis et al. | 206/315.11 |
| 4,433,781 | 2/1984 | Hummel | 206/314 |
| 4,763,791 | 8/1988 | Halverson et al. | 206/523 |
| 5,172,575 | 12/1992 | Fisher | 206/317 |
| 5,316,178 | 5/1994 | Garber, Jr. | 206/523 |
| 5,320,223 | 6/1994 | Allen | 206/523 |
| 5,347,746 | 9/1994 | Letson | 206/315.11 |

*Primary Examiner*—David T. Fidei

[57] ABSTRACT

A fishing rod and accessories carrying case, such that a rigid lid is pivotally mounted to a rigid container, and the container having an interior compartment mounted coextensively therewithin, with a foam insert, and the foam insert includes a plurality of recesses to include reception of a fishing rod as well as various accessory containers to secure the accessory containers of the fishing rod in a stationary relationship within the container when the lid is secured to the container, with a sealing member mounted to the lid to effect a fluid-tight seal within the container when the lid is secured to the container to provide for a buoyant carrying case structure.

1 Claim, 4 Drawing Sheets

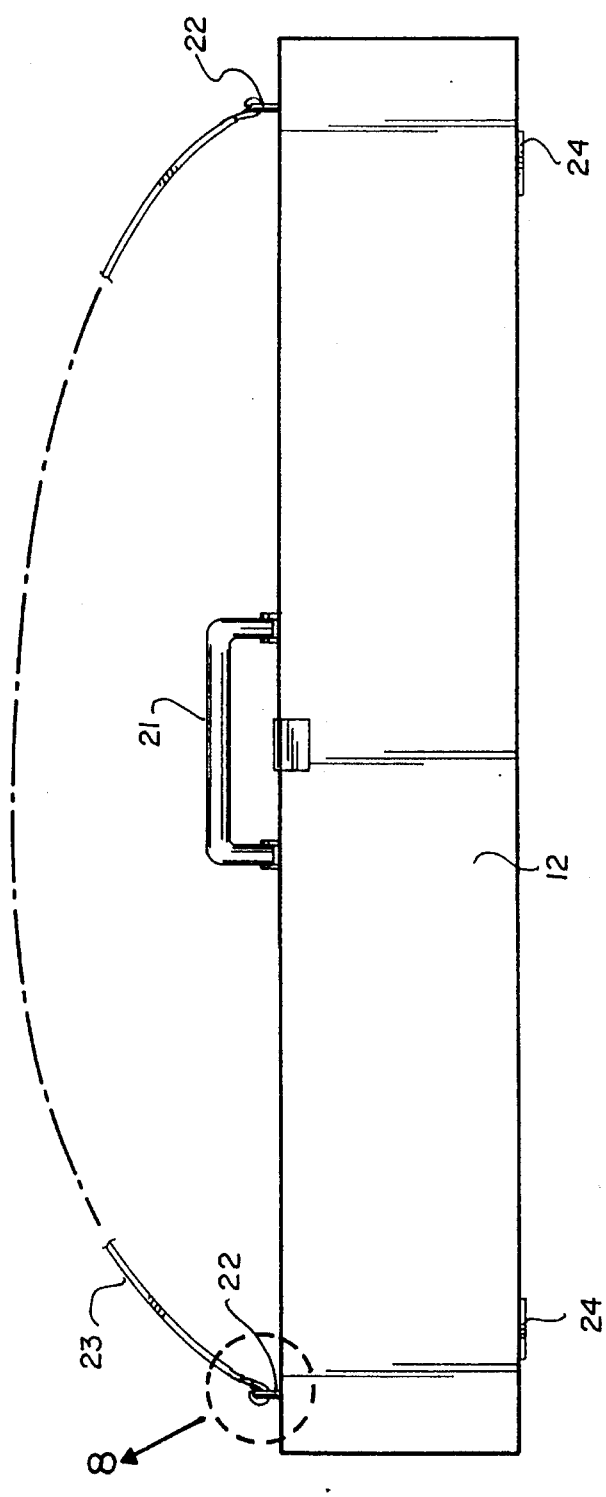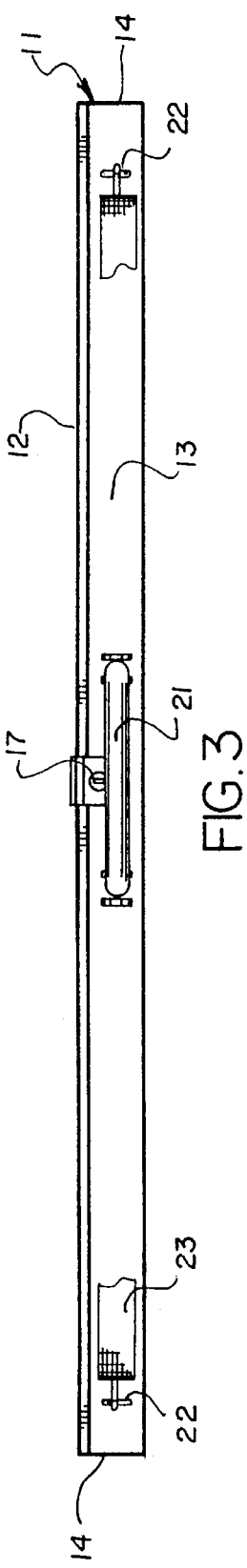

FISHING ROD AND ACCESSORIES CARRYING CASE

TECHNICAL FIELD

The field of invention relates to carrying case structure, and more particularly pertains to a new and improved fishing rod and accessories carrying case wherein the same is arranged to securely transport in a buoyant case a fishing rod and accessories therefor.

BACKGROUND OF THE INVENTION

Prior art structure relative to fishing rod carrying case structure is indicated and exemplified by U.S. Pat. No. 4,726,141 of a flexible case construction.

U.S. Pat. No. 3,772,819 sets forth a generally elongate tubular carrying case structure having a plurality of compartments accessed through opposed ends of the case structure.

U.S. Pat. No. 3,972,144 is a further example of a flexible carrying case for fishing rods and the like, with U.S. Pat. No. 5,046,279 a further example of a rigid case whose end cap permits access interiorly of the case structure.

SUMMARY OF THE INVENTION

The fishing rod and accessories carrying case of the invention is directed to an improved carrying case structure, wherein a rigid exterior shell permits access to an interior polymeric foam having inserts for supporting a fishing rod and various accessories therefor in a water-tight, buoyant case organization, such that the case will float within a body of water if such becomes necessary.

Objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 2 is an orthographic side view of the invention.

FIG. 3 is an orthographic front view of the invention.

DESCRIPTION OF THE PREFERRED EMBODIMENT

As required, detailed embodiments of the present invention are disclosed herein; however, it is to be understood that the disclosed embodiments are merely exemplary of the invention, which may be embodied in various forms, therefore, specific structural and functional details disclosed herein are not to be interpreted as limiting, but merely as a basis for the claims and as a representative basis for teaching one skilled in the art to variously employ the present invention in virtually any appropriately detailed structure.

Figure 5:
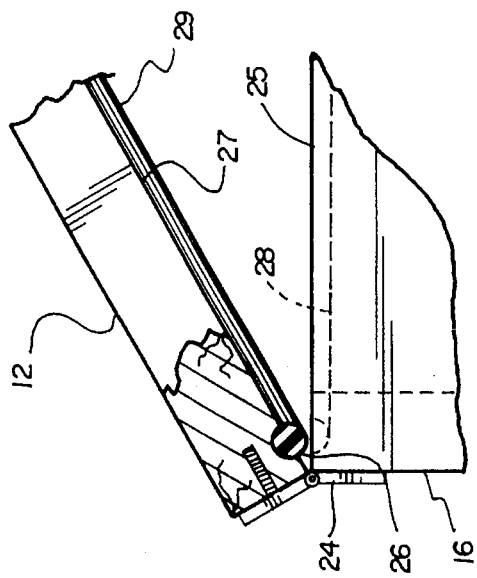
FIG. 5 is an enlarged orthographic view, partially in cross-section, of the lid and hinge structure as well as the continuous seal of the invention.
Figure 4:
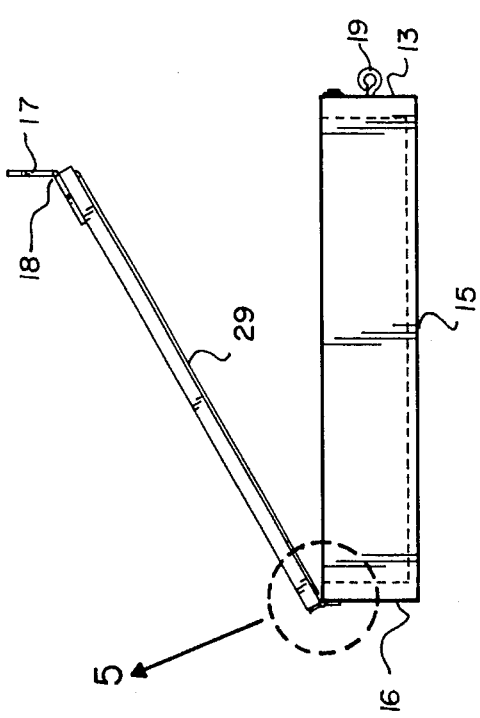
FIG. 4 is an orthographic end view of the invention.
Figure 6:
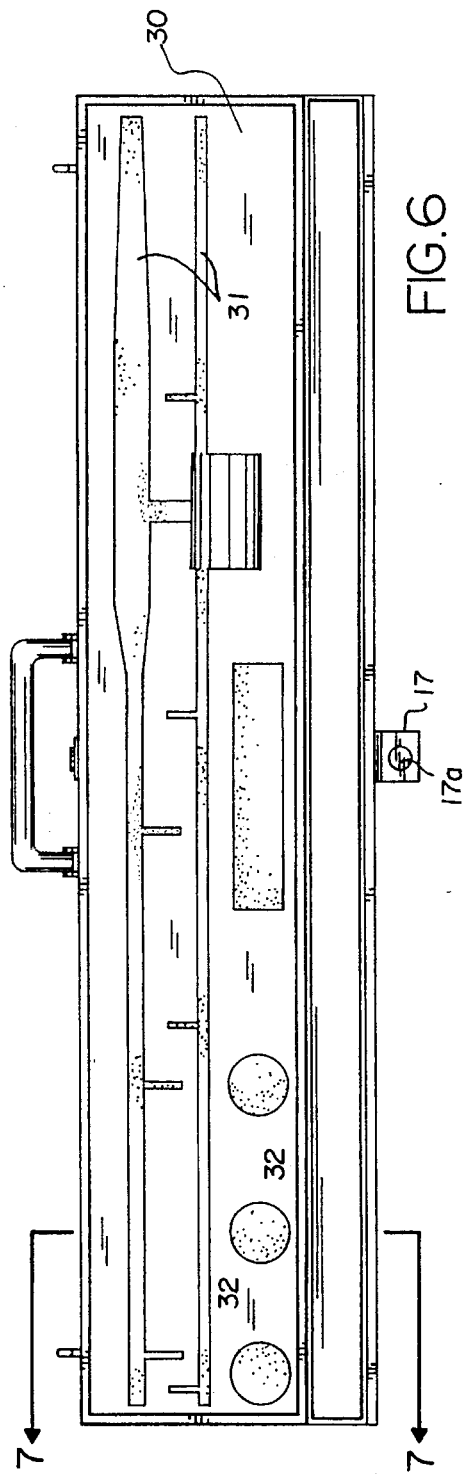
FIG. 6 is an orthographic top view of the case structure with the lid opened for viewing of the insert structure of the case.

The fishing rod and accessories carrying case 10 of the invention essentially comprises a rigid container 11 having a front wall 13 spaced from a rear wall 16, with spaced side walls 14 as well as a bottom wall 15 defining a container continuous perimeter top wall having a continuous container recess 28 (see FIG. 5) directed therein. A lid 12 is provided having at least one lid hinge 24 secured to the lid 12 and to the rear wall 16 to pivotally mount the lid relative to the container, with the lid 12 further having a latch plate 17 hingedly mounted to the lid about a latch plate hinge 18 for extending over the front wall 13 when the lid is engaged to the container top wall 25. The latch plate 17 in this manner receives a locking loop 29 therethrough, that in turn is fixedly secured to the front wall 13, such that the locking loop permits the reception of a lock (not shown) for selective latching of the lid 12 relative to the container. The lock loop 19 is rotatably mounted relative to the front wall, such that typically a slot in the latch plate receives the locking loop 19, whereupon subsequent rotation through a ninety degree angle and the like of the locking loop arrests the latch plate 17 relative the front wall. The slot 17a is indicated in FIG. 6 for example.

Figure 1:
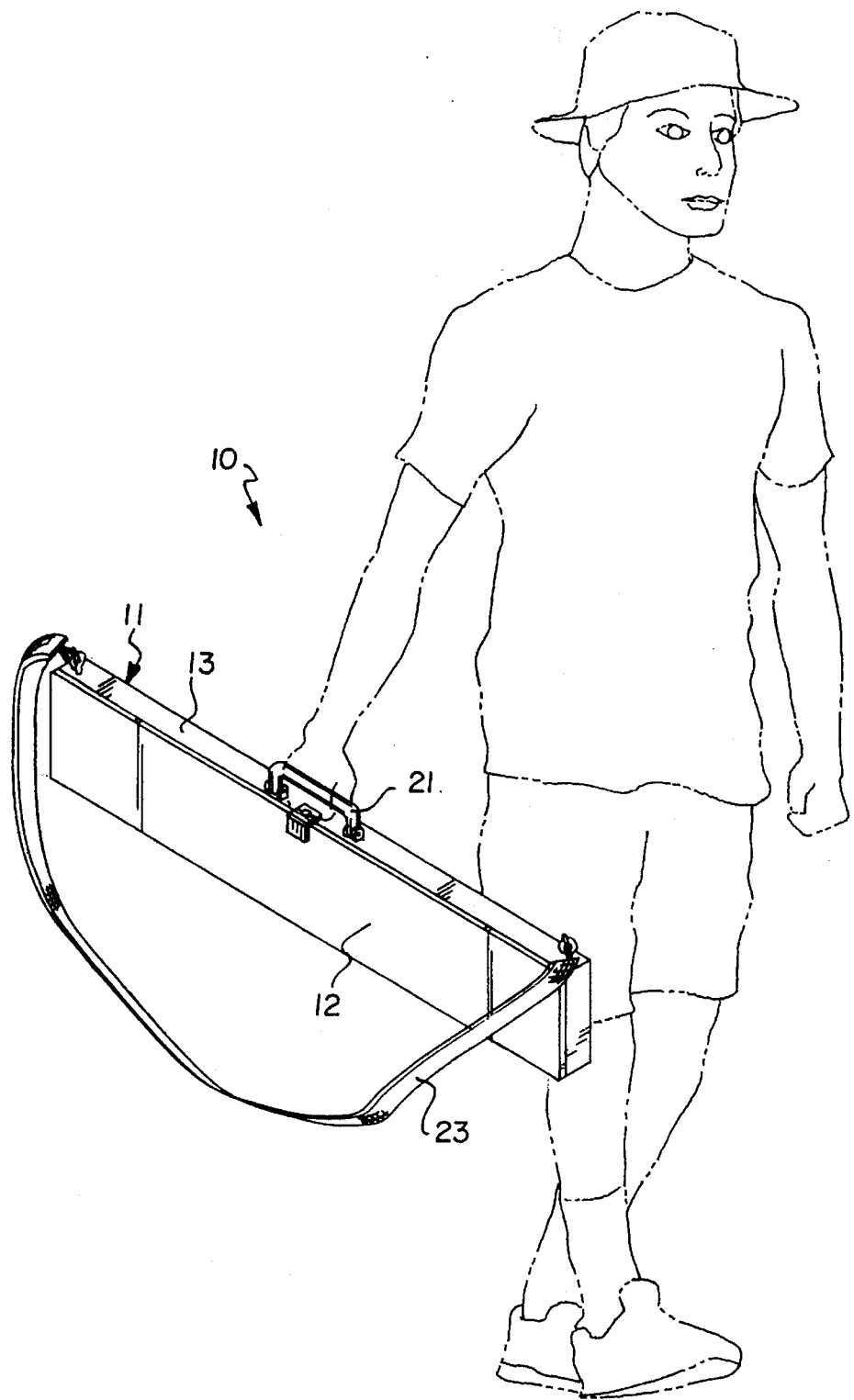
FIG. 1 is an isometric illustration of the invention in use.

A transport handle 21 is pivotally mounted medially relative to the front wall 13 for ease of transport of the case structure, as indicated in FIG. 1, wherein additionally, a plurality of spaced pivot loops 22 are fixedly secured to the front wall, with one of the pivot loops 22 adjacent each of the side walls 14 of the container 11. A flexible belt 23 extends between the pivot loops 22 to permit shoulder transport of the case structure.

Figure 7:
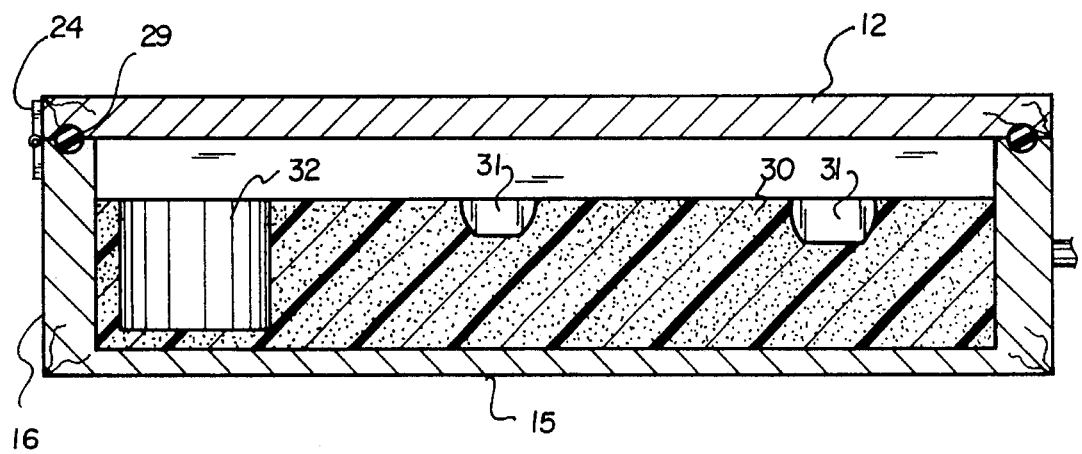
FIG. 7 is an orthographic view, taken along the lines 7—7 of FIG. 6 in the direction indicated by the arrows.
Figure 8:
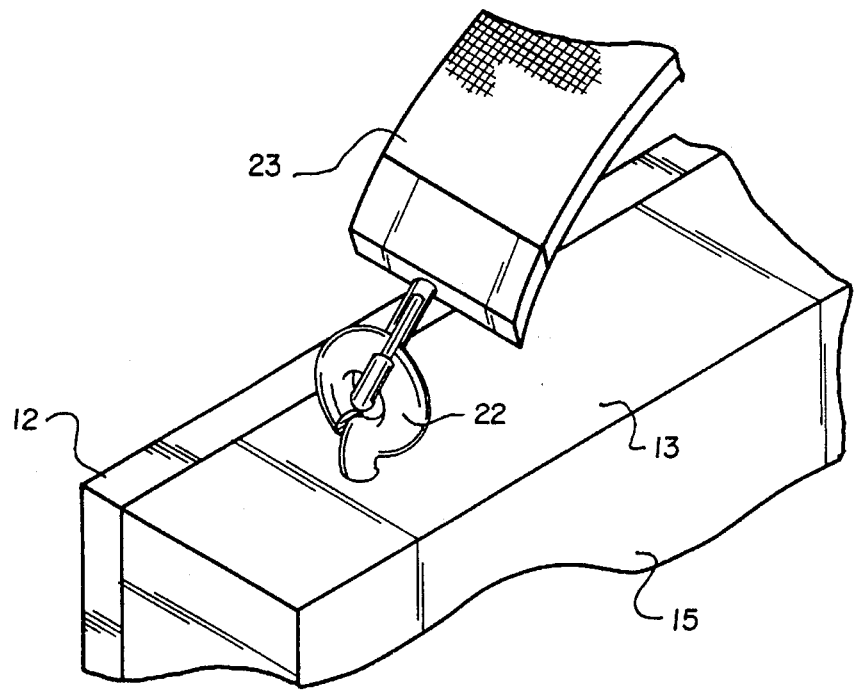
FIG. 8 is an enlarged orthographic view of section 8 as set forth in FIG. 2.

The lid 12 includes a lid continuous bottom perimeter wall 26, having a continuous lid recess 27 arranged in a mirror image facing relationship relative to the container continuous recess 28 when the lid is secured to the container, such that a continuous resilient seal 29 is fixedly secured within the lid recess 27 for reception within the container recess 28 when the lid is secured to the container to thusly provide for a fluid-tight sealing arrangement preventing access of water into the case when the lid is latched to thusly provide for a buoyant container utilizing entrapped air, as well as the inherent buoyancy of the polymeric foam insert 30 (see FIGS. 6 and 7 for example), with such foam insert 30 directed coextensively within the container. The foam insert 30 is provided with a plurality of recesses to specifically include a plurality of elongate first recesses 31 to receive an associated fishing pole, but the recesses further include a plurality of generally cylindrical second recesses 32 to receive various jars and cylindrical containers that in turn contain bait, fishing lures, and the like. In this manner, components within the case structure are maintained in a non-slip relationship to further ease transport of the structure, with the specific positioning of the various components within the case providing for enhanced ease of transport due to non-shifting of components within the case, as well as maintaining the various components within the case when thusly transported in a non-agitated and non-disruptive manner.

If so desired, an alternative manner of positioning components within the case structure may be directed to various foam covered pegs (not shown) that are fixedly secured to the bottom wall 15 of the case to thereby position various components. The preferred embodiment is illustrated utilizing recesses, but it should be understood that the alternative manner of construction is noted.

It is to be understood that while certain forms of the present invention have been illustrated and described herein, it is not to be limited to the specific forms or arrangement of parts described and shown.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed and desired to be protected by LETTERS PATENT of the United States is as follows:

1. A fishing rod and accessories carrying case comprising:

a rigid rectangular container having a front wall spaced from a rear wall, space sided walls and a bottom wall defining an interior compartment of the container, with a hinged lid pivotally mounted to the rear wall;

a first recess extending completely around the top edges of said rear, front and side walls, and a second complementary recess extending completely around the edges of said hinged lid in a confronting mirror image relationship to said first recess;

a continuous resilient seal disposed within said second recess wherein said seal is received within said first recess when the lid is closed so as to provide for a fluid impermeable interior compartment within the container and lid;

a polymeric foam insert snugly engaged within said walls of said interior compartment;

a first elongated recess in said foam insert extending substantially the entire length of the bottom wall of said compartment, said elongated recess having an enlarged diameter at one end thereof to accommodate the handle portion of a fishing rod and an elongated narrower diameter for the major portion of said recess to accommodate the pole section of a fishing rod;

a further plurality of cylindrical recesses in said foam insert spaced from and extending substantially along the length of said elongated recess for receipt of containers for bait, fishing lures and accessories therein;

a handle member pivotally and medially secured to the exterior of said front wall, and a pair of pivot loops fixedly mounted to said front wall each adjacent to a respective one of the side walls; and a flexible strap extending loosely between said pivot loops;

and, a latch plate having a latch plate hinge pivotally mounting said latch plate to said lid opposite the hinged side of said lid, and said latch plate arranged to extend over said front wall of said container to engage a slot in said latch plate with a latch loop pivotally mounted to said front wall of said container.

* * * * *